(12) United States Patent
Kim et al.

(10) Patent No.: US 12,568,377 B2
(45) Date of Patent: Mar. 3, 2026

(54) METHOD FOR IMEI VERIFICATION AND UNAUTHORIZED DEVICE DETECTION USING CONTROL PLANE MESSAGE AND THE SYSTEM THEREOF

(71) Applicant: Korea Advanced Institute of Science and Technology, Daejeon (KR)

(72) Inventors: Yongdae Kim, Daejeon (KR);
Sangwook Bae, Daejeon (KR);
CheolJun Park, Daejeon (KR);
Beomseok Oh, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 251 days.

(21) Appl. No.: 18/472,021

(22) Filed: Sep. 21, 2023

(65) Prior Publication Data

US 2024/0107316 A1     Mar. 28, 2024

(30) Foreign Application Priority Data

Sep. 23, 2022    (KR) ........................ 10-2022-0120586

(51) Int. Cl.
*H04W 12/71*        (2021.01)
*H04W 12/037*      (2021.01)

(52) U.S. Cl.
CPC ......... *H04W 12/71* (2021.01); *H04W 12/037* (2021.01)

(58) Field of Classification Search
CPC .............. H04W 12/037; H04W 12/71; H04W 12/126; H04W 12/06; H04W 12/122; H04W 12/79; H04W 12/08; H04W 12/72; H04L 63/0876; H04L 43/12; H04L 9/40; G06F 21/44
See application file for complete search history.

(56) References Cited

U.S. PATENT DOCUMENTS 9,532,215 B2 * 12/2016 Webb ...................... H04L 9/321
9,578,498 B2 *  2/2017 Du ........................ H04L 63/126
9,805,370 B1 * 10/2017 Quigley ................. H04W 4/80
(Continued)

FOREIGN PATENT DOCUMENTS

AU    2021417645 B2 *  2/2025  ............ H04W 12/72
CN    118301027 A  *  7/2024  ......... H04L 49/9063

OTHER PUBLICATIONS

Request for the Submission of an Opinion for KR 10-2022-0120586, mailed May 22, 2024.
(Continued)

*Primary Examiner* — Lizbeth Torres-Diaz
(74) *Attorney, Agent, or Firm* — Christensen O'Connor Johnson Kindness PLLC

(57)                ABSTRACT
Disclosed is a method and system for international mobile equipment identity (IMEI) verification and unauthorized terminal detection based on contents of control plane messages exchanged in a process of a terminal that accesses a commercial network in a mobile communication network and the method includes constructing a fingerprint database for each terminal using contents of a control plane message generated in a process of a terminal that accesses a commercial network and a response to the control plane message; and verifying IMEI for an arbitrary terminal that accesses the commercial network using the fingerprint database.

18 Claims, 6 Drawing Sheets

(56) References Cited

U.S. PATENT DOCUMENTS

| 11,848,929 | B2 * | 12/2023 | Götze | ................... | H04W 8/183 |
|---|---|---|---|---|---|
| 2009/0165094 | A1 * | 6/2009 | Colom | ................. | H04L 9/3226 |
| | | | | | 726/4 |
| 2012/0278871 | A1 * | 11/2012 | Wang | ................... | H04L 63/083 |
| | | | | | 726/7 |
| 2014/0335831 | A1 * | 11/2014 | Lamberton | ......... | H04W 12/126 |
| | | | | | 455/411 |
| 2016/0036796 | A1 * | 2/2016 | Xia | ................... | H04W 12/0431 |
| | | | | | 726/1 |
| 2020/0007538 | A1 * | 1/2020 | Mehta | ................... | H04W 12/72 |
| 2022/0329591 | A1 * | 10/2022 | Hua | ................... | H04L 63/0815 |
| 2023/0081990 | A1 * | 3/2023 | Saini | ................... | H04W 8/205 |
| | | | | | 370/338 |
| 2023/0205857 | A1 * | 6/2023 | Sato | ................... | G06Q 50/265 |
| | | | | | 713/186 |

OTHER PUBLICATIONS

Appendix 1 Network-level Fingerprinting of Cellular Devices such as SIMBOX, and 2021 Security @ KAIST end, Nov. 24, 2021.

* cited by examiner

FIG. 3

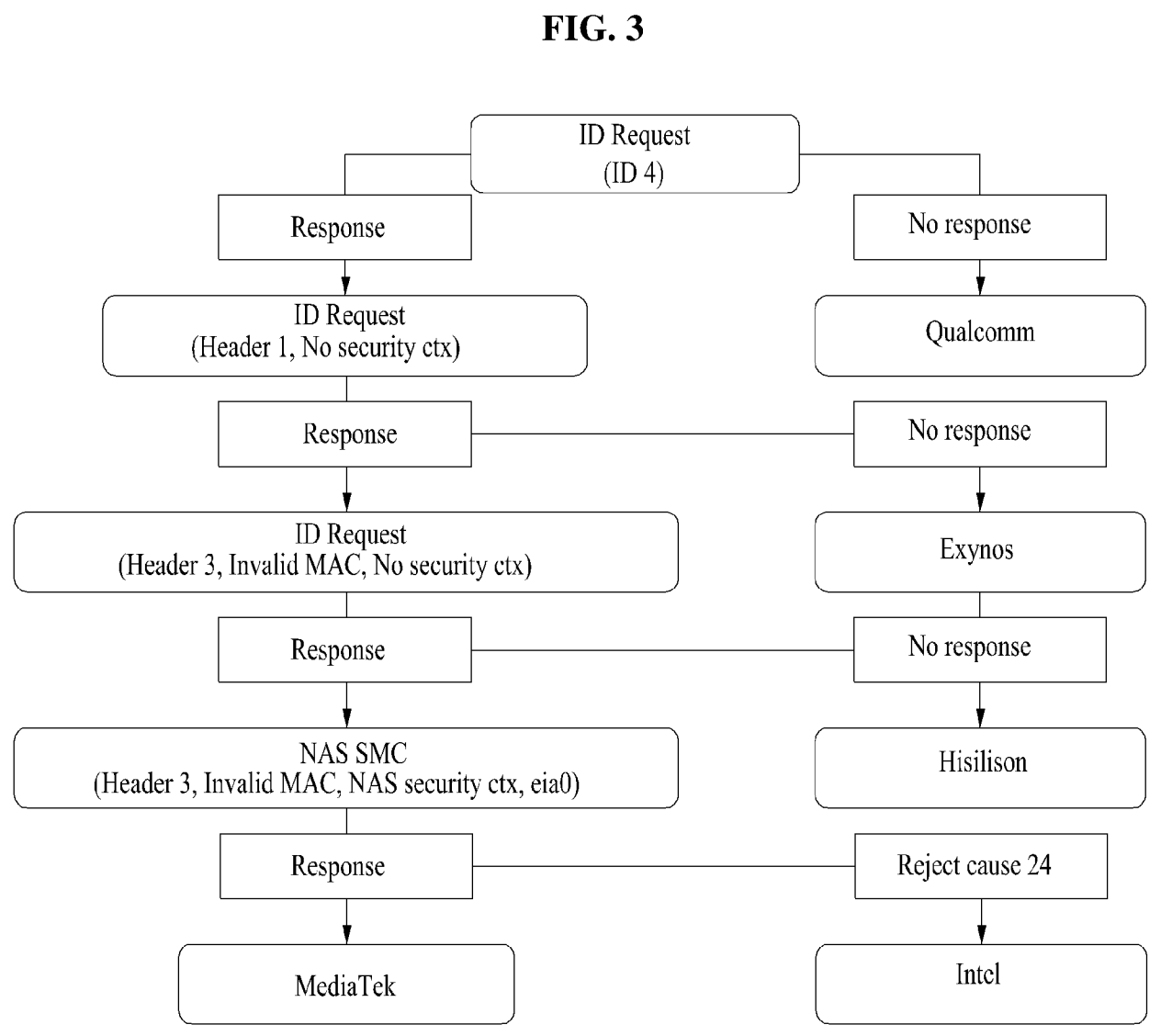

| | |
|---|---|
| ID Request (ID 4) | No response → Qualcomm |
| Response → ID Request (Header 1, No security ctx) | No response → Exynos |
| Response → ID Request (Header 3, Invalid MAC, No security ctx) | No response → Hisilison |
| Response → NAS SMC (Header 3, Invalid MAC, NAS security ctx, eia0) | Reject cause 24 → Intel |
| Response → MediaTek | |

Data construction unit
(610)

Verification unit
(620)

METHOD FOR IMEI VERIFICATION AND UNAUTHORIZED DEVICE DETECTION USING CONTROL PLANE MESSAGE AND THE SYSTEM THEREOF

CROSS-REFERENCE TO RELATED APPLICATION

This application claims the priority benefit of Korean Patent Application No. 10-2022-0120586, filed on Sep. 23, 2022, in the Korean Intellectual Property Office, the disclosure of which is incorporated herein by reference.

BACKGROUND

1. Field of the Invention

The following description of example embodiments relates to a method and system for international mobile equipment identity (IMEI) verification and unauthorized terminal detection using a control plane message, and more particularly, to technology for verifying IMEI based on contents of control plane messages exchanged in a process of a terminal that accesses a commercial network in a mobile communication network.

2. Description of the Related Art

In a mobile communication network, an identifier called international mobile equipment identity (IMEI) is used to identify a terminal. The IMEI refers to information assigned to each terminal such that each terminal may have a different unique value in a terminal manufacturing process and is designed to have device information, such as a device manufacturer and a device name. Such IMEI is set to a baseband of a corresponding terminal. The IMEI is an important identifier used by a mobile communication company to provide and manage a service. Mobile communication providers selectively provide a call function to devices that are to access a network using IMEI information or perform a service that limits provision of an additional service.

Also, IMEI information plays an important role in managing access of a stolen terminal and an unauthorized terminal. Using a characteristic that IMEI has a unique value for each terminal, a mobile communication provider registers IMEI of a terminal reported stolen to a blacklist and, when the terminal reported stolen is to access a network, verifies IMEI information and denies the access to prevent the use. Representatively, in the case of Qualcomm, a service called Device Identification, Registration and Blocking System (DIRBS) has been developed and applied to telecommunications companies. Also, a mobile communication company manages access of unauthorized terminals using a characteristic that device information is included in an IMEI value. Representatively, in the case of a terminal (e.g., a terminal purchased overseas) called an Open Market Device (OMD), Voice over Long Term Evolution (VoLTE) service may be used only after acquiring OMD approval from a mobile communication provider.

However, the existing blacklist-based IMEI management method is very vulnerable since change to another IMEI value may be easily performed by spoofing IMEI through the existing many studies and software or through an AT COMMAND message to a baseband in a terminal. Therefore, when an attacker modifies and uses IMEI of a terminal reported stolen or an unauthorized terminal of which use is denied, there is a limit that the corresponding terminal may access a network and use a service without being detected by mobile communication providers.

SUMMARY

An objective of example embodiments is to generate a fingerprint for each terminal based on a difference in contents of control plane messages and a difference in operation occurring due to a difference in implementation and a difference in specifications of terminals, such as providable wireless technology, for each baseband in a terminal and to perform international mobile equipment identity (IMEI) verification.

However, technical subjects to be solved by the disclosure are not limited to the aforementioned subjects and may be variously expanded without departing from technical spirit and scope of the disclosure.

According to an aspect of an example embodiment, there is provided a terminal detection method for IMEI verification and unauthorized terminal detection using a control plane message, the method including constructing a fingerprint database for each terminal using contents of a control plane message generated in a process of a terminal that accesses a commercial network and a response to the control plane message; and verifying IMEI for an arbitrary terminal that accesses the commercial network using the fingerprint database.

The constructing of the fingerprint database may include constructing the fingerprint database for each terminal based on contents of a passive message generated in the process of the terminal that accesses the commercial network and a response of an active probing message that is delivered from the commercial network to the terminal. Here, the passive message refers to a message that is sent/received between a corresponding network and a terminal in a process of the terminal that accesses the commercial network. Also, the active probing message refers to an arbitrary control plane message that may be sent from the commercial network to the terminal.

The constructing of the fingerprint database may include collecting and recording control plane messages delivered from different types of terminals to a base station and constructing the fingerprint database using a decision tree and a machine learning technique based on collected information.

The constructing of the fingerprint database may include generating the decision tree based on contents of a passive message that is a control plane message delivered to the base station in the process of the terminal that accesses the commercial network and generating the fingerprint database by acquiring a baseband manufacturer of each of terminals using the decision tree.

The constructing of the fingerprint database may include generating the decision tree with a response difference of an active probing message that is a control plane message delivered from the base station to a network to acquire a response of the terminal and generating the fingerprint database using the decision tree.

The verifying of the IMEI may include extracting a fingerprint corresponding to the arbitrary terminal.

The verifying of the IMEI may include comparing the extracted fingerprint and a fingerprint corresponding to the IMEI for the arbitrary terminal in the fingerprint database and verifying the IMEI based on a matching status.

The verifying of the IMEI may include receiving a control plane message generated in response to the arbitrary terminal that accesses the commercial network; extracting a fingerprint of the arbitrary terminal based on the received control plane message; acquiring the IMEI of the arbitrary terminal, verifying a model type of the arbitrary terminal from the fingerprint database, and acquiring a fingerprint of the corresponding model type; comparing the acquired fingerprint and the extracted fingerprint of the arbitrary terminal; and performing IMEI verification and unauthorized terminal detection for the arbitrary terminal according to a comparison result.

The performing of the IMEI verification and the unauthorized terminal detection may include detecting that the arbitrary terminal is a legitimately authorized terminal without the IMEI being modified when the acquired fingerprint and the extracted fingerprint of the arbitrary terminal match, and detecting that the arbitrary terminal is an unauthorized terminal with the IMEI being modified when the acquired fingerprint and the extracted fingerprint of the arbitrary terminal do not match.

According to another aspect of an example embodiment, there is provided a method for IMEI verification and unauthorized terminal detection using a control plane message, the method including constructing a fingerprint database for each terminal using contents of a control plane message generated in a process of a terminal that accesses a commercial network and a response to the control plane message; extracting a fingerprint corresponding to IMEI of an arbitrary terminal that accesses the commercial network; and comparing the extracted fingerprint and the fingerprint database and performing IMEI verification and unauthorized terminal detection for the arbitrary terminal.

The extracting of the fingerprint may include receiving a control plane message generated in response to the arbitrary terminal that accesses the commercial network and extracting a fingerprint of the arbitrary terminal based on the received control plane message.

The performing of the IMEI verification and the unauthorized terminal detection may include verifying the IMEI of the arbitrary terminal, verifying a model type of the arbitrary terminal from the fingerprint database, acquiring a fingerprint of the corresponding model type, comparing the acquired fingerprint and the extracted fingerprint of the arbitrary terminal, and performing IMEI verification and unauthorized terminal detection for the arbitrary terminal.

According to still another aspect of an example embodiment, there is provided a terminal detection system for IMEI verification and unauthorized terminal detection using a control plane message, the terminal detection system including a data construction unit configured to construct a fingerprint database for each terminal using contents of a control plane message generated in a process of a terminal that accesses a commercial network and a response to the control plane message; and a verification unit configured to verify IMEI for an arbitrary terminal that accesses the commercial network using the fingerprint database.

The data construction unit may be configured to construct the fingerprint database for each terminal based on contents of a passive message generated in the process of the terminal that accesses the commercial network and a response of an active probing message that is delivered from the commercial network to the terminal.

The data construction unit may be configured to collect and record control plane messages delivered from different types of terminals to a base station and to construct the fingerprint database using a decision tree and a machine learning technique based on collected information.

The data construction unit may be configured to generate the decision tree based on contents of a passive message that is a control plane message delivered to the base station in the process of the terminal that accesses the commercial network and to generate the fingerprint database by acquiring a baseband manufacturer of each of terminals using the decision tree.

The data construction unit may be configured to generate the decision tree with a response difference of an active probing message that is a control plane message delivered from the base station to a network to acquire a response of the terminal and to generate the fingerprint database using the decision tree.

The verification unit may be configured to extract a fingerprint corresponding to the arbitrary terminal, to compare the extracted fingerprint and a fingerprint corresponding to the IMEI for the arbitrary terminal in the fingerprint database, and to verify the IMEI based on a matching status.

The verification unit may be configured to receive a control plane message generated in response to the arbitrary terminal that accesses the commercial network, to extract a fingerprint of the arbitrary terminal based on the received control plane message, to acquire the IMEI of the arbitrary terminal, verify a model type of the arbitrary terminal from the fingerprint database, and acquire a fingerprint of the corresponding model type, to compare the acquired fingerprint and the extracted fingerprint of the arbitrary terminal, and to perform IMEI verification and unauthorized terminal detection for the arbitrary terminal according to a comparison result.

The verification unit may be configured to detect that the arbitrary terminal is a legitimately authorized terminal without the IMEI being modified when the acquired fingerprint and the extracted fingerprint of the arbitrary terminal match, and to detect that the arbitrary terminal is an unauthorized terminal with the IMEI being modified when the acquired fingerprint and the extracted fingerprint of the arbitrary terminal do not match.

According to example embodiments, it is possible to prevent an abnormal access of an unauthorized terminal by verifying IMEI of a terminal that accesses a commercial network using a fingerprint that is generated with a control plane message of the terminal.

However, the effects of the disclosure are not limited to the aforementioned effects and may be variously expanded without departing from the technical spirit and scope of the disclosure.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 3 illustrates an example of a decision tree for classifying a baseband manufacturer based on an active probing message and a response thereto according to an example embodiment;

FIG. 6 is a block diagram illustrating a detailed configuration of a system for IMEI verification and unauthorized terminal detection according to an example embodiment.

DETAILED DESCRIPTION

Figure 1:
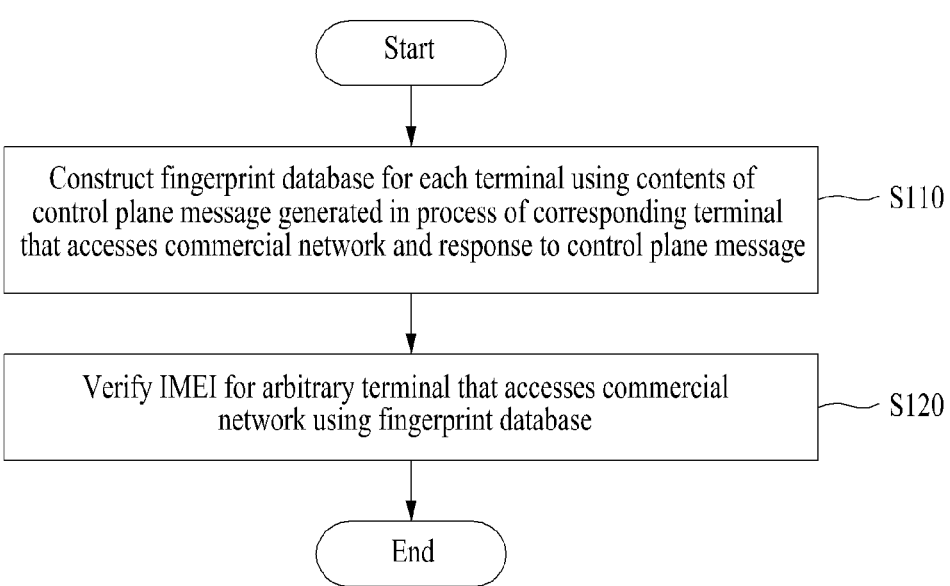
FIG. 1 is a flowchart illustrating a method for international mobility equipment identity (IMEI) verification and unauthorized terminal detection according to an example embodiment.

Advantages and features of the present invention and methods of achieving the same will become clear with reference to example embodiments described in detail with the accompanying drawings. However, the present invention is not construed as being limited to the example embodiments disclosed below and will be implemented in various forms different from each other. The example embodiments are provided to make the disclosure of the present invention complete and to inform the scope of the present invention to one of ordinary skill in the art to which the present invention pertains and the present invention is only defined by the scope of the claims.

The terminology used herein is for the purpose of describing the example embodiments only and is not to be limiting the present invention. As used herein, the singular forms "a," "an," and "the" are intended to include the plural forms as well, unless the context clearly indicates otherwise. It will be further understood that the terms "comprises" and/or "comprising," when used in this specification, specify the presence of stated components, operations, and/or elements, but do not preclude the presence or addition of one or more other components, operations, and/or elements.

Unless otherwise defined herein, all terms used herein (including technical or scientific terms) have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, example embodiments will be described in detail with reference to the accompanying drawings. When describing the example embodiments with reference to the accompanying drawings, like reference numerals refer to like components and a repeated description related thereto will be omitted.

Example embodiments relate to verifying international mobility equipment identity (IMEI) based on contents of control plane messages exchanged in a process of a terminal that accesses a communication network in a mobile communication network.

To verify technology for IMEI verification and unauthorized terminal detection according to example embodiments proposed herein, it was verified that 45 commercial terminals (smartphones) were used and each terminal had a different fingerprint. The terminals used for verification refer to terminals having seven types of terminal manufacturers and five types of basebands and it was verified that classification by each terminal/each terminal manufacturer/baseband manufacturer was possible. Through this, although IMEI was modified, it was confirmed that it was possible to verify whether a corresponding terminal reported valid IMEI to a mobile communication network by verifying control plane messages exchanged with a network. This function may be used to prevent an abnormal access of an unauthorized terminal.

Further, the proposed technology for IMEI verification and unauthorized terminal detection according to an example embodiment may be used by applying the following scenarios.

A first scenario relates to IMEI verification for preventing an access of a stolen terminal. When an attacker acquires a stolen terminal and then desires to access a network by changing IMEI of the terminal, whether the terminal uses forged/modified IMEI is detected through IMEI verification of the terminal. This contributes to recovering a stolen terminal by preventing an access of the corresponding terminal to a network or by tracking the access. Also, it is not difficult to modify the IMEI of the terminal and it is possible to easily modify the IMEI through many previously disclosed software. However, to avoid the proposed technology, a baseband operation logic needs to be modified to make 1) modification of a control plane message and 2) processing of a control plane message sent from the network identical to a terminal corresponding to the IMEI. This operation has the effect of making it difficult for an attacker to make an IMEI forgery/modification attack by increasing difficulty and cost of the attack.

A second scenario refers to detecting and blocking an access attempt of an unauthorized terminal to a network. SIMBOX refers to equipment that is widely used for voice phishing that is an issue using a fingerprint in a baseband and provides a VoIP gateway function of exchanging an Internet phone to a call through a cellular network. SIMBOX has a baseband like other terminals and is recognized as a general terminal in a network when accessing a mobile communication network. However, that corresponding equipment uses a normal service through an access to a mobile communication network may expose customers to threat of voice phishing and may lead to a decrease in revenues for mobile communication companies. The proposed technology may be used to construct a system that searches for such equipment and block an access to a network. A fingerprint of a baseband used by SIMBOX may be constructed and whether equipment that is to make an access is SIMBOX may be verified through IMEI verification technology according to an example embodiment. Although the access is attempted by modifying IMEI, the technology may generate a fingerprint based on exchanged control plane messages and may verify forged/modified IMEI and specify a device through comparison to information in the constructed database. Through this, an unauthorized terminal may be blocked from accessing a mobile communication network and an additional management may be provided to be available.

Hereinafter, example embodiments will be further described with reference to FIGS. 1 to 6.

Figure 2:
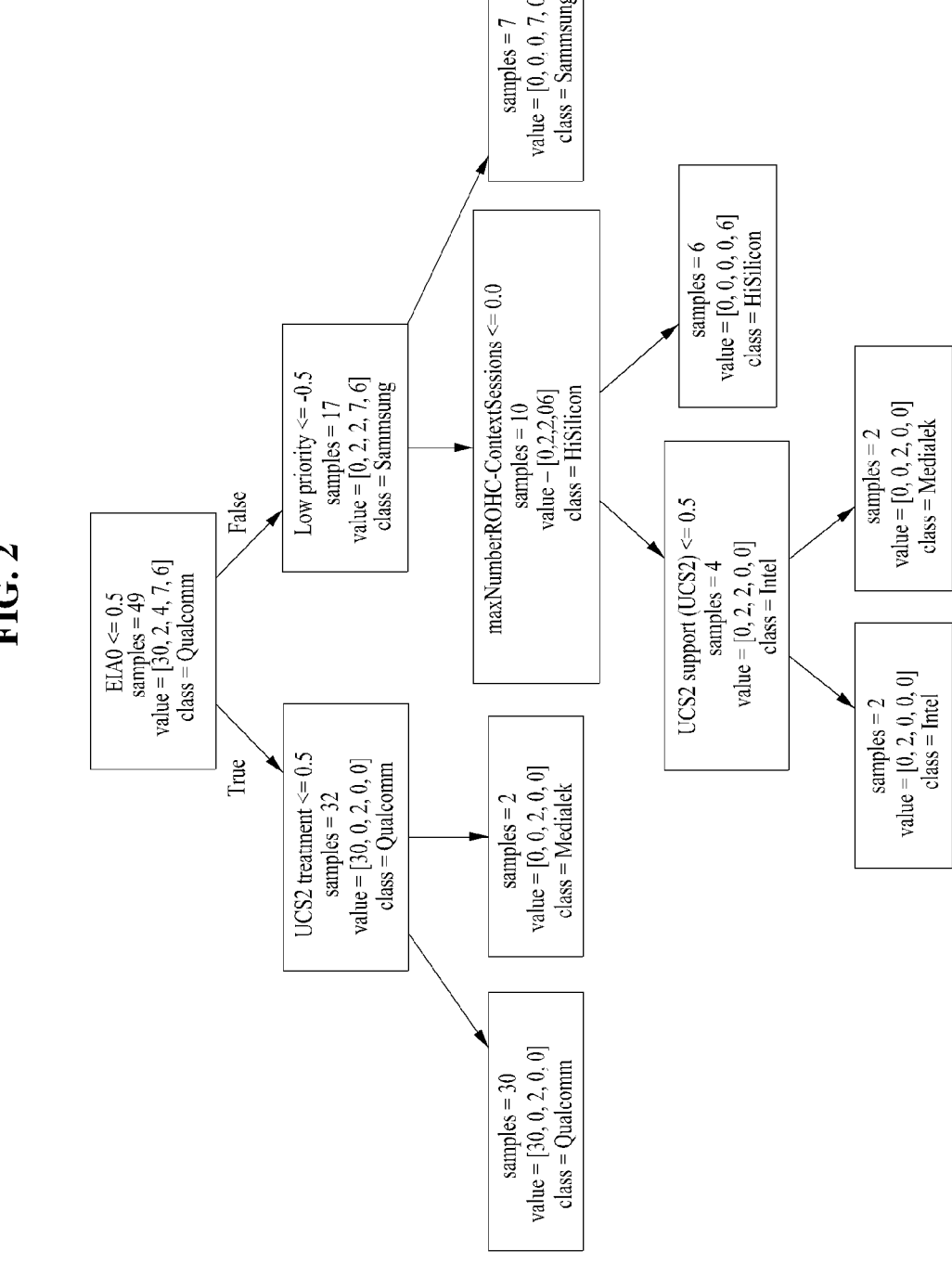
FIG. 2 illustrates an example of using a decision tree according to an example embodiment.

FIG. 1 is a flowchart illustrating a method for IMEI verification and unauthorized terminal detection according to an example embodiment. Also, FIG. 2 illustrates an example of using a decision tree according to an example embodiment, and FIG. 3 illustrates an example of a decision tree for classifying a baseband manufacturer based on an active probing message and a response thereto according to an example embodiment.

The technology for IMEI verification and unauthorized terminal detection according to an example embodiment may largely include two operations. A first operation (operation S110) refers to a fingerprint database construction process and generates a fingerprint database for each terminal based on contents of a control plane message generated in a process of a corresponding terminal that accesses a commercial network and a response when a probing message is sent from a network. A second operation (operation S120) compares a fingerprint corresponding to IMEI of the corresponding accessed terminal from a pre-constructed fingerprint database and verifies the IMEI by verifying a matching status.

Further describing with reference to FIG. 1, in operation S110, the fingerprint database is constructed for each terminal using contents of a control plane message generated in a process of a corresponding terminal that accesses the commercial network and a response to the control plane message.

In operation S110, the fingerprint database may be constructed for each terminal based on contents of a passive message generated in the process of the terminal that accesses the commercial network and a response of an active probing message that is delivered from the commercial network to the terminal.

Herein, the control plane message is used to acquire information of the terminal. In detail, the example embodiment generates a fingerprint for each terminal based on contents of a control plane message that differs for each terminal model and a processing result of the control plane message and acquires terminal information based on the generated fingerprint, instead of using an IMEI value in the control plane message.

RRC and NAS that are control plane protocols of LTE are implemented according to a standard defined by $3^{rd}$ Generation Partnership Project (3GPP) and all manufacturers implement control plane protocols in a baseband according to the standard. However, the standard only defines basic operations and the purpose of each control plane message and other exceptional occasions are not defined and thus, there is a degree of freedom in an implementation process. Therefore, although there is one standard, contents of the control plane message may vary depending on baseband implementation of a corresponding terminal or hardware specifications or supportable technology of the terminal. Even the same control plane message may be differently processed and responded for each baseband.

A fingerprint proposed by terminal detection technology according to an example embodiment is generated using such a difference for each terminal. For this fingerprint generation, it is necessary to verify different contents in control plane messages exchanged between a terminal and a mobile communication network in a network access process and to verify how a processing result differs according to a message sent from the network. To this end, in operation S110, control plane messages sent from different types of terminals are collected and recorded to construct the fingerprint database. Then, specific information corresponding to a criterion for identifying a terminal is discovered based on the collected information. To search for the criterion, a decision tree and a machine learning technique are used in operation S110. Also, the criterion for identifying a terminal may be a terminal model, a terminal manufacturer (e.g., Samsung, LG, APPLE, Huawei, etc.), a terminal baseband manufacturer (Qualcomm, Samsung, Intel, etc.), and the like.

Here, a control plane message may be divided into a control plane message sent to a base station and evolved packet core (EPC) in the process of a terminal that accesses a mobile communication network and a response to a control plane message sent from the base station to the terminal. Herein, the control plane message delivered to the base station in the process of the terminal that accesses the mobile communication network is referred to as a passive message and the control plane message sent from the base station to the network to acquire a response of the terminal is referred to as an active probing message.

Therefore, in operation S110 of FIG. 1, control plane messages delivered from different model types of terminals to the base station are collected and recorded and the fingerprint database is constructed using a decision tree and a machine learning technique based on the collected information.

Here, in operation S110, the decision tree may be generated based on contents of the passive message that is the control plane message delivered to the base station in the process of the terminal that accesses the commercial network and the fingerprint database may be generated by acquiring a baseband manufacturer of each terminal using the decision tree.

Describing a process of generating a fingerprint based on contents of passive messages with reference to FIG. 2, RRC UEcapabilityInformation and NAS Attack request message may be noteworthy in contents related to fingerprint construction. UE Capability refers to contents related to functions supported by the terminal and includes encryption, whether an integrity algorithm is supported, and the like. This information differs for each terminal and also differs for each chipset manufacturer and thus, is a good indicator for identifying a corresponding terminal. Therefore, the RRC UEcapabilityInformation and the NAS Attack request message in the contents are used to construct the fingerprint database. FIG. 2 is an experimental result showing that a decision tree may be generated based on contents of a control plane message and a baseband manufacturer of each terminal may be acquired through the decision tree. Also, the generated decision tree may be classified for each model of a terminal device.

Also, in operation S110, the decision tree may be generated with a response difference of the active probing message that is the control plane message delivered from the base station to the terminal to acquire a response of the terminal and the fingerprint database may be generated using the decision tree.

Describing a process of generating a decision tree based on an active probing message with reference to FIG. 3, the active probing message represents an RRC/NAS message sent from a base station or EPC to a terminal to acquire a response of the terminal. Messages to be used for database construction may be selected based on the following criteria.

a) When a control plane message is sent, an operation of a terminal is not defined.

b) When a control plane message is sent, an operation between terminals differs.

If the operation of the terminal is defined in the standard, terminals that do not follow the standard have vulnerability. Therefore, there may be no terminal implementation difference for such a message. To distinguish terminals with a response difference from a terminal, messages of which operations are not defined in the standard need to be used. FIG. 3 illustrates a result of configuring active probing messages into NAS messages and generating a decision tree based on a response difference thereof.

Referring again to FIG. 1, in operation S120 of the terminal detection method according to an example embodiment, IMEI for an arbitrary terminal that accesses the commercial network is verified using the fingerprint database.

The terminal detection method according to an example embodiment applies the constructed fingerprint database to the mobile communication network and then, generates a fingerprint based on contents of a control plane message exchanged between a terminal (hereinafter, referred to as an arbitrary terminal) that is to access the mobile communication network and the mobile communication network and a response of an active probing message, compares a fingerprint corresponding to IMEI of the arbitrary terminal in the constructed fingerprint database, and verifies a matching status. Through this, the IMEI reported by the arbitrary terminal to access may be verified based on whether the reported IMEI matches an actual characteristic of IMEI of the corresponding terminal. According to the aforementioned description, in operation S120, the fingerprint corresponding to the arbitrary terminal to access may be extracted, the extracted fingerprint may be compared to the fingerprint corresponding to the IMEI for the arbitrary terminal in the fingerprint database, and the IMEI may be verified based on the matching status.

In detail, operation S120 may include a first operation of receiving a control plane message generated in response to the arbitrary terminal that accesses the commercial network, a second operation of extracting a fingerprint of the arbitrary terminal based on the received control plane message, a third operation of acquiring the IMEI of the arbitrary terminal, verifying a model type of the arbitrary terminal from the fingerprint database, and acquiring a fingerprint of the corresponding model type, a fourth operation of comparing the acquired fingerprint and the extracted fingerprint of the arbitrary terminal, and a fifth operation of performing IMEI verification and unauthorized terminal detection for the arbitrary terminal according to a comparison result.

Here, in the fifth operation, when the acquired fingerprint and the extracted fingerprint of the arbitrary terminal match, the arbitrary terminal may be detected as a legitimately authorized terminal without the IMEI being modified, and when the acquired fingerprint and the extracted fingerprint of the arbitrary terminal do not match, the arbitrary terminal may be detected as an unauthorized terminal with the IMEI being modified. The aforementioned IMEI verification process for the arbitrary terminal is further described with reference to FIG. 5.

Figure 4:
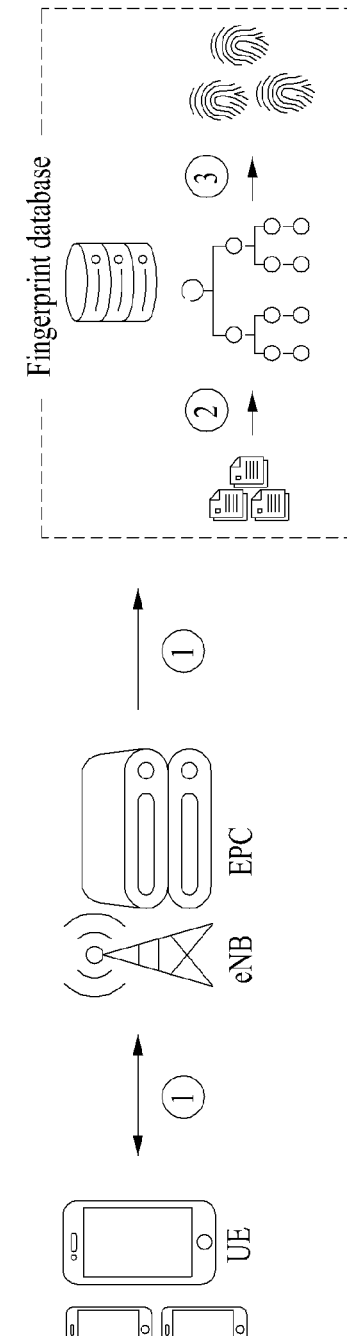
FIG. 4 illustrates a process of constructing a database by extracting a fingerprint for each terminal according to an example embodiment.
Figure 5:
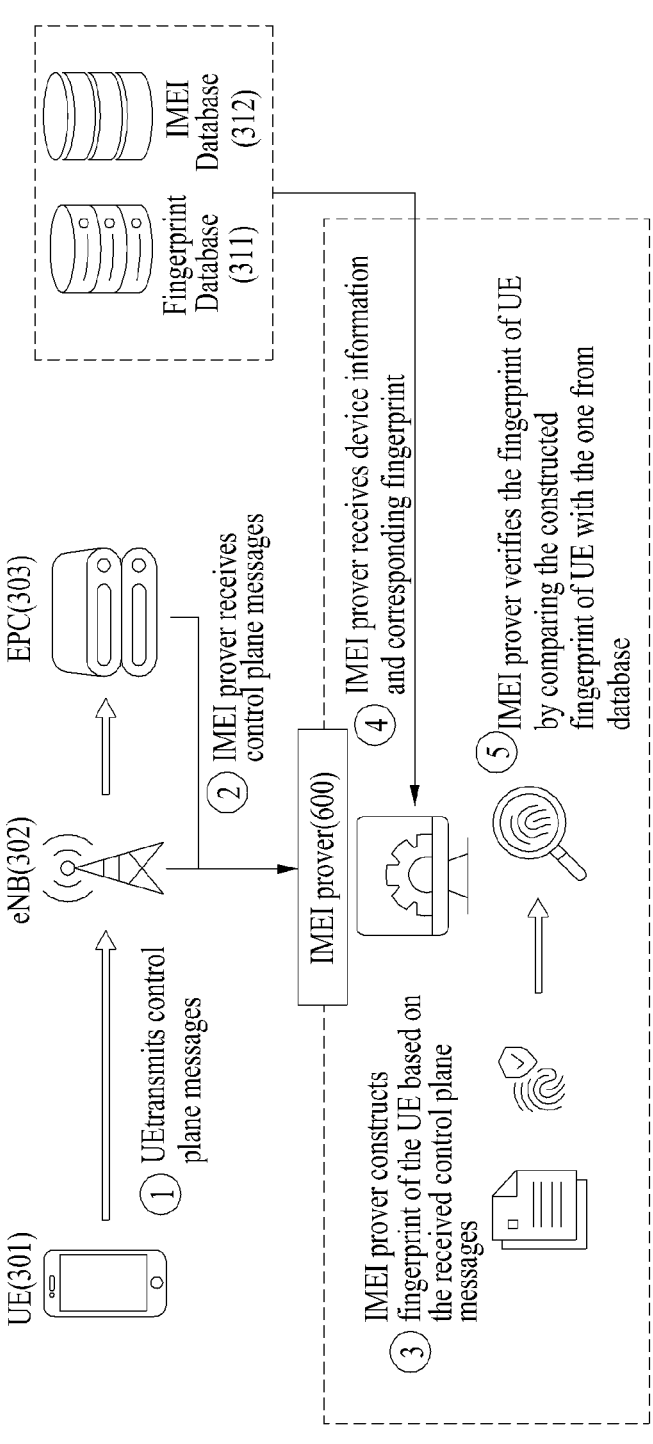
FIG. 5 illustrates an IMEI verification process for an arbitrary terminal according to an example embodiment.

FIG. 4 illustrates a process of constructing a database by extracting a fingerprint for each terminal according to an example embodiment, and FIG. 5 illustrates an IMEI verification process for an arbitrary terminal according to an example embodiment.

The aforementioned technology for IMEI verification and unauthorized terminal detection according to an example embodiment may largely include two operations. A first operation refers to an operation of constructing a fingerprint database by verifying messages sent from various types of user equipment (UEs) (terminals) to evolved node base (eNB) (base station) in evolved packet core (EPC) and then collecting the same. Here, the terms "UE" and "terminal" may be interchangeably used and the terms "eNB" and "base station" may be interchangeably used. Here, the fingerprint database refers to a database in which each model type of fingerprint is generated and collected by collecting a response of a message according to a type of each terminal and by using appropriate responses among the collected responses. A second operation refers to an operation of constructing a fingerprint database and then verifying IMEI using the fingerprint database when an arbitrary terminal accesses a commercial network.

FIG. 4 illustrates a process of constructing the fingerprint database and illustrates a process of exchanging messages between a terminal, for example, a UE, and a base station, for example, eNB, as in (①). The process includes all of a message sent from the terminal to the base station in a process of the terminal that accesses a network and a response to the message sent from the base station to the terminal. Through this, a message delivered to a core network is also delivered to the fingerprint database. Based on control plane messages collected by the fingerprint database (②), a fingerprint is generated through a passive/active probing method (③) and stored.

Hereinafter, a process of verifying IMEI when an arbitrary terminal accesses a commercial network using a fingerprint database is described with reference to FIG. 5.

In ① and ②, a base station (eNB) 502 and a core network (EPC) 503 deliver a message generated when a terminal (UE) 501 accesses a commercial network to an IMEI verification system (IMEI prover) 600.

In ③, a fingerprint database 511 is constructed by extracting a fingerprint of a terminal that attempts an access based on the delivered control plane messages.

In ④, IMEI reported by the terminal that attempts the access is verified, information is received from an IMEI database 512 maintained by a mobile communication provider, a model of the accessed arbitrary terminal is verified, and a fingerprint of the corresponding model is received.

In ⑤, the generated fingerprint and a fingerprint corresponding to the IMEI reported by the terminal from the database are compared. If they match, the arbitrary terminal that attempts the access has reported not-modified IMEI and is determined as a legitimately authorized terminal. On the contrary, if they do not match, the arbitrary terminal that attempts the access is determined as an unauthorized terminal and having reported the modified IMEI.

Figure 6:
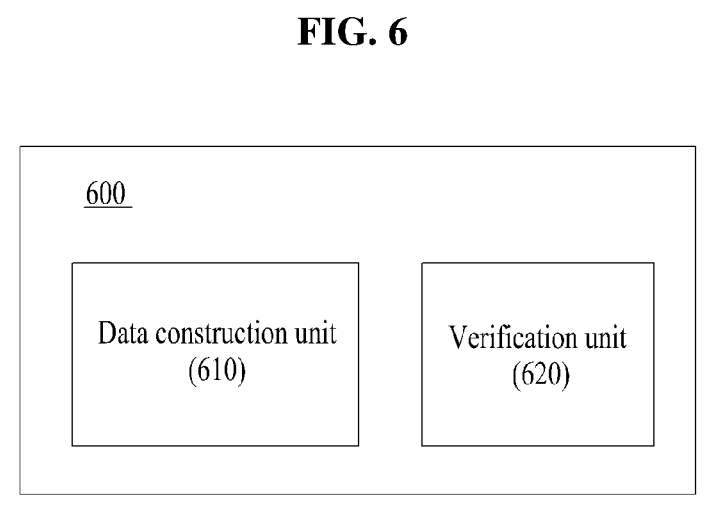

FIG. 6 is a diagram illustrating a configuration of a system for IMEI verification and unauthorized terminal detection according to an example embodiment.

A terminal detection system according to an example embodiment verifies IMEI based on contents of control plane messages exchanged in a process of a terminal that accesses a commercial network in a mobile communication network.

Referring to FIG. 6, a terminal detection system 600 according to an example embodiment includes a data construction unit 610 and a verification unit 620.

Referring to FIG. 6, the data construction unit 610 constructs a fingerprint database for each terminal using contents of a control plane message generated in a process of a terminal that accesses a commercial network and a response to the control plane message.

The data construction unit 610 may construct the fingerprint database for each terminal based on contents of a passive message generated in the process of the terminal that accesses the commercial network and a response of an active probing message delivered from the commercial network to the terminal.

That is, the data construction unit 610 collects and records control plane messages delivered from different types of terminals to a base station and constructs the fingerprint database using a decision tree and a machine learning technique based on collected information.

Here, the data construction unit 610 may generate the decision tree based on contents of a passive message that is a control plane message delivered to the base station in the process of the terminal that accesses the commercial network and may generate the fingerprint database by acquiring a baseband manufacturer of each of terminals using the decision tree.

Also, the data construction unit 610 may generate the decision tree with a response difference of an active probing message that is a control plane message delivered from the base station to a network to acquire a response of the terminal and may generate the fingerprint database using the decision tree.

The verification unit 620 verifies IMEI for an arbitrary terminal that accesses the commercial network using the fingerprint database.

The verification unit 620 may extract a fingerprint corresponding to the arbitrary terminal that attempts an access, may compare the extracted fingerprint and a fingerprint corresponding to the IMEI for the arbitrary terminal in the fingerprint database, and may verify the IMEI based on a matching status.

In detail, the verification unit 620 may include a first operation of receiving a control plane message generated in response to the arbitrary terminal that accesses the commercial network, a second operation of extracting a fingerprint of the arbitrary terminal based on the received control plane message, a third operation of acquiring the IMEI of the arbitrary terminal, verifying a model type of the arbitrary terminal from the fingerprint database, and acquiring a fingerprint of the corresponding model type, a fourth operation of comparing the acquired fingerprint and the extracted fingerprint of the arbitrary terminal, and a fifth operation of performing IMEI verification and unauthorized terminal detection for the arbitrary terminal according to a comparison result.

Here, in the fifth operation, the verification unit 620 may detect that the arbitrary terminal is a legitimately authorized terminal without the IMEI being modified when the acquired fingerprint and the extracted fingerprint of the arbitrary terminal match, and may detect that the arbitrary terminal is an unauthorized terminal with the IMEI being modified when the acquired fingerprint and the extracted fingerprint of the arbitrary terminal do not match.

Although the description is omitted in the system of FIG. 6, each component of FIG. 6 may include all the contents described with reference to FIGS. 1 to 5, which is apparent to one skilled in the art.

The systems and/or apparatuses described herein may be implemented using hardware components, software components, and/or a combination thereof. For example, apparatuses and components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the example embodiments may be recorded in non-transitory computer-readable media including program instructions to implement various operations embodied by a computer. Also, the media may include, alone or in combination with the program instructions, data files, data structures, and the like. Program instructions stored in the media may be those specially designed and constructed for the example embodiments, or they may be well-known and available to those having skill in the computer software arts. Examples of non-transitory computer-readable media include magnetic media such as hard disks, floppy disks, and magnetic tapes; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The hardware devices may be configured to operate as one or more software modules to perform an operation of the example embodiments, or vice versa.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A terminal detection method for international mobile equipment identity (IMEI) verification and unauthorized terminal detection, the method comprising:

constructing a fingerprint database for each terminal using contents of a control plane message generated in a process of a terminal that accesses a commercial network and a response to the control plane message; and verifying IMEI for an arbitrary terminal that accesses the commercial network using the fingerprint database, wherein the constructing of the fingerprint database comprises collecting and recording control plane messages delivered from different types of terminals to a base station and constructing the fingerprint database using a decision tree and a machine learning technique based on the collected control plane messages.

2. The method of claim 1, wherein the constructing of the fingerprint database comprises constructing the fingerprint database for each terminal based on contents of a passive message generated in the process of the terminal that accesses the commercial network and a response of an active probing message that is delivered from the commercial network to the terminal.

3. The method of claim 1, wherein the constructing of the fingerprint database comprises generating the decision tree based on contents of a passive message that is a control plane message delivered to the base station in the process of the terminal that accesses the commercial network and generating the fingerprint database by acquiring a baseband manufacturer of each of terminals using the decision tree.

4. The method of claim 3, wherein the constructing of the fingerprint database comprises generating the decision tree with a response difference of an active probing message that is a control plane message delivered from the base station to a network to acquire a response of the terminal and generating the fingerprint database using the decision tree.

5. The method of claim 1, wherein the verifying of the IMEI comprises extracting a fingerprint corresponding to the arbitrary terminal.

6. The method of claim 5, wherein the verifying of the IMEI comprises comparing the extracted fingerprint and a fingerprint corresponding to the IMEI for the arbitrary terminal in the fingerprint database and verifying the IMEI based on a matching status.

7. The method of claim 6, wherein the verifying of the IMEI comprises:

receiving a control plane message generated in response to the arbitrary terminal that accesses the commercial network;

extracting a fingerprint of the arbitrary terminal based on the received control plane message;

acquiring the IMEI of the arbitrary terminal, verifying a model type of the arbitrary terminal from the fingerprint database, and acquiring a fingerprint of the corresponding model type;

comparing the acquired fingerprint and the extracted fingerprint of the arbitrary terminal; and performing IMEI verification and unauthorized terminal detection for the arbitrary terminal according to a comparison result.

8. The method of claim 7, wherein the performing of the IMEI verification and the unauthorized terminal detection comprises:

detecting that the arbitrary terminal is a legitimately authorized terminal without the IMEI being modified when the acquired fingerprint and the extracted fingerprint of the arbitrary terminal match, and detecting that the arbitrary terminal is an unauthorized terminal with the IMEI being modified when the acquired fingerprint and the extracted fingerprint of the arbitrary terminal do not match.

9. A method for international mobile equipment identity (IMEI) verification and unauthorized terminal detection, the method comprising:

constructing a fingerprint database for each terminal using contents of a control plane message generated in a process of a terminal that accesses a commercial network and a response to the control plane message;

extracting a fingerprint corresponding to IMEI of an arbitrary terminal that accesses the commercial network; and comparing the extracted fingerprint and the fingerprint database and performing IMEI verification and unauthorized terminal detection for the arbitrary terminal, wherein the constructing of the fingerprint database comprises collecting and recording control plane messages delivered from different types of terminals to a base station and constructing the fingerprint database using a decision tree and a machine learning technique based on the collected control plane messages.

10. The method of claim 9, wherein the extracting of the fingerprint comprises receiving a control plane message generated in response to the arbitrary terminal that accesses the commercial network and extracting a fingerprint of the arbitrary terminal based on the received control plane message.

11. The method of claim 10, wherein the performing of the IMEI verification and the unauthorized terminal detection comprises verifying the IMEI of the arbitrary terminal, verifying a model type of the arbitrary terminal from the fingerprint database, acquiring a fingerprint of the corresponding model type, comparing the acquired fingerprint and the extracted fingerprint of the arbitrary terminal, and performing IMEI verification and unauthorized terminal detection for the arbitrary terminal.

12. A terminal detection system for international mobile equipment identity (IMEI) verification and unauthorized terminal detection, the terminal detection system comprising:

a data construction unit configured to construct a fingerprint database for each terminal using contents of a control plane message generated in a process of a terminal that accesses a commercial network and a response to the control plane message; and a verification unit configured to verify IMEI for an arbitrary terminal that accesses the commercial network using the fingerprint database, wherein the data construction unit is configured to collect and record control plane messages delivered from different types of terminals to a base station and to construct the fingerprint database using a decision tree and a machine learning technique based on the collected control plane messages.

13. The terminal detection system of claim 12, wherein the data construction unit is configured to construct the fingerprint database for each terminal based on contents of a passive message generated in the process of the terminal that accesses the commercial network and a response of an active probing message that is delivered from the commercial network to the terminal.

14. The terminal detection system of claim 12, wherein the data construction unit is configured to generate the decision tree based on contents of a passive message that is a control plane message delivered to the base station in the process of the terminal that accesses the commercial network and to generate the fingerprint database by acquiring a baseband manufacturer of each of terminals using the decision tree.

15. The terminal detection system of claim 14, wherein the data construction unit is configured to generate the decision tree with a response difference of an active probing message that is a control plane message delivered from the base station to a network to acquire a response of the terminal and to generate the fingerprint database using the decision tree.

16. The terminal detection system of claim 12, wherein the verification unit is configured to extract a fingerprint corresponding to the arbitrary terminal, to compare the extracted fingerprint and a fingerprint corresponding to the IMEI for the arbitrary terminal in the fingerprint database, and to verify the IMEI based on a matching status.

17. The terminal detection system of claim 16, wherein the verification unit is configured to receive a control plane message generated in response to the arbitrary terminal that accesses the commercial network, to extract a fingerprint of the arbitrary terminal based on the received control plane message, to acquire the IMEI of the arbitrary terminal, verify a model type of the arbitrary terminal from the fingerprint database, and acquire a fingerprint of the corresponding model type, to compare the acquired fingerprint and the extracted fingerprint of the arbitrary terminal, and to perform IMEI verification and unauthorized terminal detection for the arbitrary terminal according to a comparison result.

18. The terminal detection system of claim 17, wherein the verification unit is configured to detect that the arbitrary terminal is a legitimately authorized terminal without the IMEI being modified when the acquired fingerprint and the extracted fingerprint of the arbitrary terminal match, and to detect that the arbitrary terminal is an unauthorized terminal with the IMEI being modified when the acquired fingerprint and the extracted fingerprint of the arbitrary terminal do not match.

* * * * *